(12) United States Patent
Wood

(10) Patent No.: US 6,721,825 B1
(45) Date of Patent: Apr. 13, 2004

(54) METHOD TO CONTROL DATA RECEPTION BUFFERS FOR PACKETIZED VOICE CHANNELS

(75) Inventor: Robert Geoffrey Wood, Ottawa (CA)

(73) Assignee: Mitel Corporation (CA)

( * ) Notice: Subject to any disclaimer, the term of this patent is extended or adjusted under 35 U.S.C. 154(b) by 0 days.

(21) Appl. No.: 09/577,397

(22) Filed: May 22, 2000

(30) Foreign Application Priority Data

May 28, 1999 (GB) ............................................. 9912575

(51) Int. Cl.[7] .................................................. G06F 3/00
(52) U.S. Cl. .............................. 710/52; 710/53; 710/56; 709/213; 709/249
(58) Field of Search ............................. 710/52–58, 60, 710/61; 709/213, 249

(56) References Cited

U.S. PATENT DOCUMENTS

| | | | | |
|---|---|---|---|---|
| 4,682,284 A | * | 7/1987 | Schrofer ...................... | 710/55 |
| 5,765,187 A | | 6/1998 | Shimizu et al. | |
| 5,850,572 A | * | 12/1998 | Dierke ........................ | 345/559 |
| 5,860,119 A | * | 1/1999 | Dockser ...................... | 711/156 |
| 5,973,252 A | * | 10/1999 | Hildebrand .................. | 84/603 |
| 5,978,868 A | * | 11/1999 | Maas .......................... | 709/234 |
| 6,026,506 A | * | 2/2000 | Anderson et al. ....... | 375/240.26 |
| 6,167,488 A | * | 12/2000 | Koppala ...................... | 710/53 |
| 6,212,206 B1 | * | 4/2001 | Ketcham ..................... | 370/216 |
| 6,317,427 B1 | * | 11/2001 | Augusta et al. .............. | 370/357 |
| 6,363,429 B1 | * | 3/2002 | Ketcham ..................... | 709/231 |
| 6,456,399 B1 | * | 9/2002 | Ho et al. ..................... | 358/404 |

FOREIGN PATENT DOCUMENTS

| | | |
|---|---|---|
| GB | 2331678 | 5/1999 |
| JP | 6268692 | 9/1994 |
| WO | 971777 | 5/1997 |

* cited by examiner

Primary Examiner—Jeffrey Gaffin
Assistant Examiner—Eron Sorrell
(74) Attorney, Agent, or Firm—Jones Day

(57) ABSTRACT

A method is provided for avoiding data loss in a data packet switch which utilizes a circular data buffer. If the data is received at a faster rate than it is read out of the buffer the data read-out pointer is adjusted by incrementing it to skip, or drop, the next sample. If the data is received at a slower rate than it is read out of the buffer, then the read-out pointer is adjusted by decrementing it to repeat the previous sample. The method of controlling the buffer read-out pointer according to the present invention, is implemented in hardware thereby reducing system complexity and improving speed relative to prior art software solutions.

3 Claims, 2 Drawing Sheets

METHOD TO CONTROL DATA RECEPTION BUFFERS FOR PACKETIZED VOICE CHANNELS

FIELD OF THE INVENTION

This invention relates in general to data transfer systems and more specifically to a method for controlling data transfer into and out of a circular buffer so as to prevent buffer overflow and underflow.

BACKGROUND OF THE INVENTION

With the advent of Voice-Over-IP (VoIP) communication systems, specialized hardware has been developed to convert synchronous TDM streams of voice data to voice packets for transmission via IP (Internet Protocol) over a LAN (Local Area Network), and vice versa. In order to accommodate variations in transmission rates into and out of such E2T devices (Ethernet-to-TDM), software algorithms have been developed to prevent data loss where the receive and transmit data streams are not synchronized. Software solutions such as are known in the prior art contribute to system complexity and loss of speed for real time applications (such as the transmission of voice traffic).

SUMMARY OF THE INVENTION

According to the present invention, a method is provided for avoiding data loss in a data packet switch which utilizes a circular data buffer. If the data is received at a faster rate than it is read out of the buffer, then the transmitter is running at a higher frequency than the receiver and the buffer will soon overflow. Therefore, according to one aspect of the invention the data read-out pointer is adjusted by incrementing it to skip, or drop, the next sample. If the data is received at a slower rate than it is read out of the buffer, then the transmitter is running at a lower frequency than the receiver and the buffer will soon underflow. Therefore, according to another aspect of the invention, the read-out pointer is adjusted by decrementing it to repeat the previous sample. The method of controlling the buffer read-out pointer according to the present invention, is implemented in hardware thereby reducing system complexity and improving speed relative to prior art software solutions.

The method according to the present invention accommodates dynamically varying packet sizes and permits a reduction in the receive buffer size, thereby resulting in savings in buffer memory and delay and latency over prior art software implementations. Also, the method of the present invention is dynamically adjustable according to network jitter, as defined by the Real Time Protocol operations specified by the IETF's RFC1889. The algorithm of the present invention does not add significant distortion or inject appreciable noise into the voice data stream, and allows for packets containing silence to be suppressed (i.e., the packets are not transmitted, thereby allowing the TDM data to be continually read out of the buffer at the local sample rate).

BRIEF DESCRIPTION OF THE DRAWINGS

Various embodiments of the present invention are described below with reference to the drawings in which.

DETAILED DESCRIPTION OF THE PREFERRED EMBODIMENT

Figure 1:
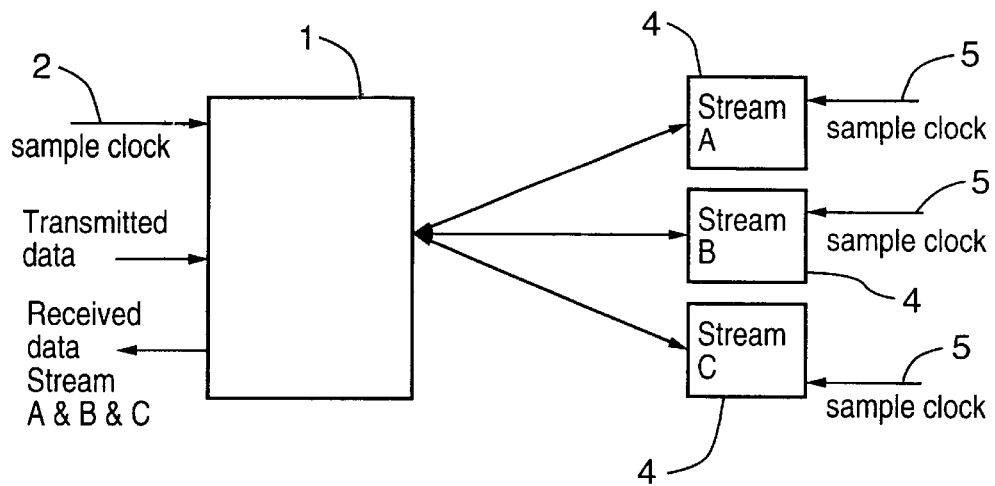
FIG. 1 is a block diagram showing a data packet transmission system according to the prior art.

FIG. 1 shows a device (1) that forms TDM data streams, normally voice streams, into packets and transmits them over a packet network. In operation, the device (1) receives transmitted data at a local sample rate, defined by a local frame pulse (2), places the TDM data into appropriate buffers (e.g. one buffer per voice stream), and transmits entire buffer contents as a data packet when a predetermined number of samples has been collected in the buffer(s). All transmitted voice streams are transmitted at the same, locally defined, rate.

The device (1) also receives packets of TDM data streams from a multiplicity of external devices (4). These packets have data rates referenced to synchronous sources, defined by local sample clocks (5) which are independent and unrelated to each other and the local frame pulse (2), but have the same nominal frequency and data rate as their respective local references (5).

When a packet from a particular one of the sources (4) is received, it is stored temporarily in a dedicated local memory buffer within the device (1). Single samples are extracted from this buffer at the local data rate (defined by the frame pulse (2)), for transmission over the local TDM channel (i.e. the received data stream A, B & C in FIG. 1). The data streams from sources A, B and C have different data rates but are output on the received TDM data stream output of the device (1) at the same data rate, which is governed by the local frame pulse (2).

Differences in the data rates into and out of each receive buffer within device (1) can result in the buffers running out of data or overfilling with data.

Figure 2:
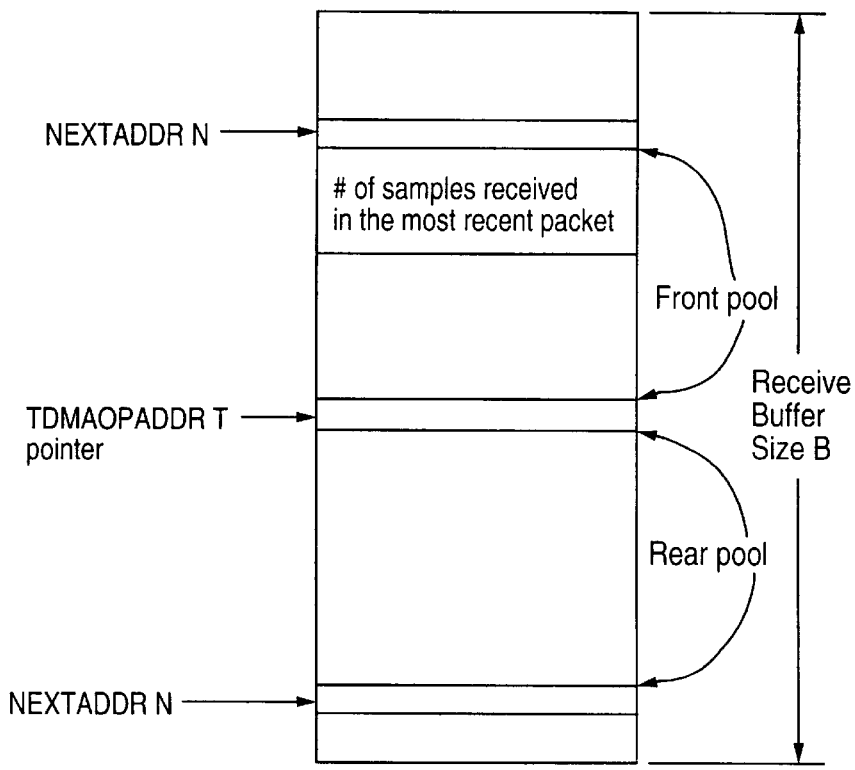
FIG. 2 is a schematic representation of a circular buffer for use in the data packet transmission system of FIG. 1.

FIG. 2 is a representation of a circular buffer and illustrates the various attributes of that buffer. The circular buffer of FIG. 2 is of a fixed size (B samples). Data packets are written into the buffer when received, starting at the location pointed to by the pointer NEXTADDR. Data is read out, one sample at a time, from the location pointed to by a TDMAOPADDR pointer, which is incremented after each sample is read so as to point to the next sample. Since the buffer is circular, the pointer NEXTADDR could have a value larger or smaller than TDMAOPADDR, as shown.

The number of samples in the buffer to be transmitted is defined as the "front pool". If data is received too slowly, then the front pool gradually shrinks until TDMAOPADDR equals NEXTADDR at which time there is no more data to transmit.

The amount of space available in the buffer to receive new packets is defined as the "rear pool". If this space becomes less than the size of a packet, then the new packet will overwrite data that has yet to be transmitted.

The method according to the present invention prevents either of these two conditions from occurring, by adjusting the pointer TDMAOPADDR to ensure adequate front and rear pools.

Figure 3:
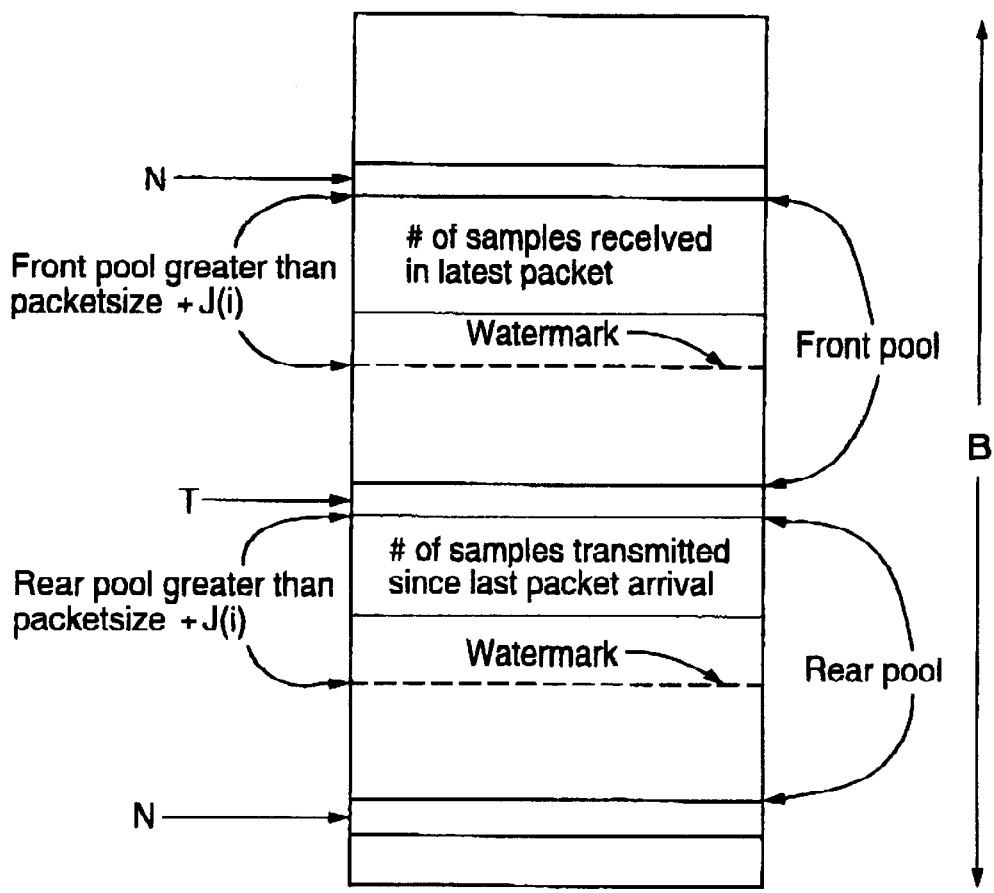
FIG. 3 is a further schematic representation of the circular buffer of FIG. 2 with notations for illustrating the buffer control method according to the present invention.

With reference to FIG. 3, data is read out of the buffer at the local receiver TDM sample rate, one sample at a time, with the result that the TDMAOPADDR pointer (T), is incremented so as to point to the next sample to be read. If the data is received at the same rate as it is read out of the buffer, then transmitter and receiver are operating at the same frequency. If the data is received at a faster rate than it is read out of the buffer, then the transmitter is running at a higher frequency than the receiver and the buffer will soon overflow, (i.e. when the rear pool becomes zero). To avoid this happening, according to the present invention the TDMAOPADDR pointer is adjusted by incrementing it to skip, or drop, the next sample. On the other hand, if the data is received at a slower rate than it is read out of the buffer, then the transmitter is running at a lower frequency than the receiver and the buffer will soon underflow, (i.e. when the front pool becomes zero). To avoid this happening, according to the present invention the TDMAOPADDR pointer is adjusted by decrementing it to repeat the previous sample. These additional adjustments to TDMAOPADDR are made each time a packet is received, thereby allowing for an adequate adjustment rate and the implementation of simple silence suppression schemes. In the latter case, if no packets are received due to silence, then TDMAOPADDR will continue being incremented at the local sample rate, (i.e. effectively free-running).

A front pool watermark is defined as N—packet size—J(i) where N is the starting address for writing the next packet; "packet size" is the number of samples contained in the packet; and J(i) is the Real Time Protocol packet inter-arrival jitter as calculated according to the Internet Engineering Task Force's RFC1889, section 6.3.1.

A rear pool watermark is defined as T—packet size—J(i) where T is the starting address of the next sample to be read out of the buffer, at the local receiver's sample rate; "packet size" is the number of samples contained in the packet; and J(i) is the Real Time Protocol packet inter-arrival jitter as calculated according to the Internet Engineering Task Force's RFC1889, section 6.3.1.

For an arbitrary buffer size, the actual size of the front pool is calculated by the algorithm FP=N−T. If FP is negative, then FP=FP+B. For a buffer size which is a binary multiple and with N and T being integers of width equivalent to the minimum number of bits required to fully address the entire buffer, then, ignoring overflow, the equation reduces to FP=N−T. Similarly, for the rear pool, RP=T−N.

The following is a section of verilog code for implementing the algorithm according to the present invention, for a buffer size of 1k samples:

reg [9:0] FP, RP, N, T;
FP=N−T;
RP=T−N;
//Increment TDMAOPADDR to point to next TDM data sample
T=T+1;
//test if TDMAOPADDR pointer adjustment is required
if ((FP)<((J>>4)+packet_size)) T=T−1;
if ((RP)<((J>>4)+packet_size)) T=T+1;

It will be appreciated that, although a particular embodiment of the invention has been described and illustrated in detail, various changes and modifications may be made.

For example, buffers can be of arbitrary sizes. Thus, for a buffer of arbitrary size (but no greater than 1K), the algorithm is described by the following verilog code:

reg [10:0] FP, RP;
reg [9:0] N, T, B;
FP={1b'0,N}−{1b'0,T};
if (FP[10]) FP=FP+B;
RP={1b'0,T}−{1b'0,N};
if (RP[10]) RP=RP+B;
//Increment TDMAOPADDR to point to next TDM data sample
T=T+1;
//test if TDMAOPADDR pointer adjustment is required
if ((FP[9:0])<((J>>4)+packet_size)) T=T−1;
if ((RP[9:0])<((J>>4)+packet_size)) T=T+1;

Also, packet size can be either a fixed quantity, with all packets containing the same number of samples, or the packet size can be dynamic, (i.e. varying from packet to packet. However, the value, packet_size, is provided by the packet reception circuitry in a well known manner.

When the method of the present invention is used to control buffers for packets which are not RTP encapsulated, then the jitter variable, J, is not available. The variable storage element for J in the verilog code implementations above, can therefore be set to a predetermined value which remains constant for all packets. The value set will generally be larger than the maximum network jitter expected and can be larger or smaller than single, or multiple, packets.

All such changes and modifications may be made without departing from the sphere and scope of the invention as defined by the claims appended hereto.

What is claimed is:

1. A method for controlling data transfer into and out of a circular buffer in a telecommunications device coupled to first and second networks, comprising the steps of:

receiving data packets from said first network and writing said data packets into said buffer starting at a first address and at incrementally increasing addresses thereafter;

reading data packets out of said buffer starting at a second address and at incrementally increasing addresses thereafter and transmitting said data packets to said second network;

in the event that said first address is greater than said second address by less than a predetermined amount then decrementing said second address before reading and transmitting of said data packets; and in the event that said second address is greater than said first address by less than a predetermined amount then incrementing said second address before reading and transmitting of said data packets.

2. The method of claim 1, wherein each of said data packets is characterized by a packet size and an inter-arrival jitter value, and wherein said predetermined amount is equivalent to said packet size plus said inter-arrival jitter value.

3. The method of claim 1, wherein each of said data packets is characterized by a packet size and wherein said predetermined amount is equivalent to said packet size plus a constant value which is larger that maximum expected network jitter associated with said data packets.

* * * * *